July 7, 1953     J. B. WEBB ET AL     2,644,571
TROLLEY CONVEYER BRACKET
Filed July 8, 1947
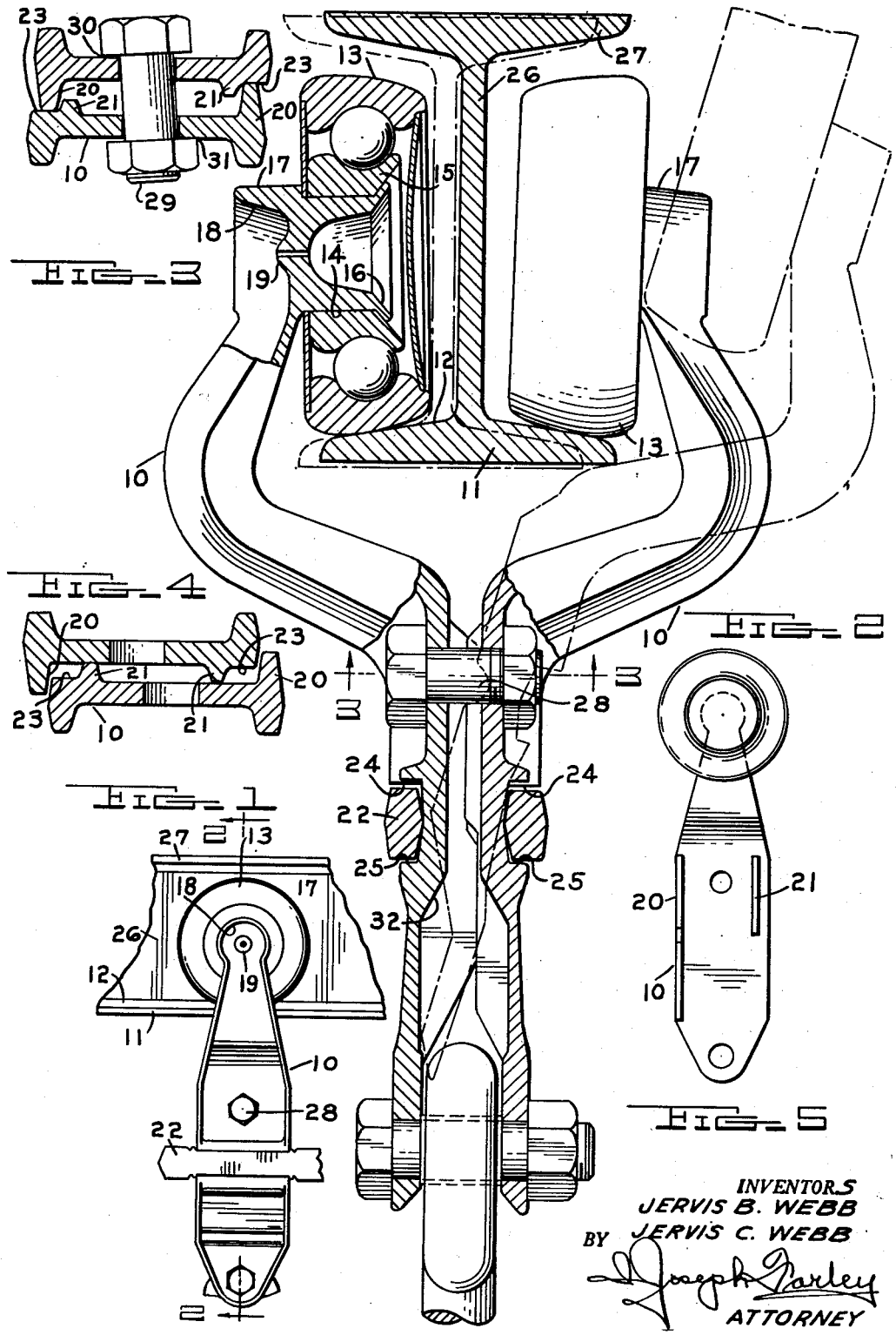
INVENTORS
JERVIS B. WEBB
BY JERVIS C. WEBB
Joseph Torley
ATTORNEY Patented July 7, 1953

2,644,571

UNITED STATES PATENT OFFICE 2,644,571

TROLLEY CONVEYER BRACKET

Jervis B. Webb, Bloomfield Hills, and Jervis C. Webb, Birmingham, Mich., assignors to Jervis B. Webb Company, Detroit, Mich., a corporation of Michigan Application July 8, 1947, Serial No. 759,486

1 Claim. (Cl. 198—177)

This invention relates to bracket constructions employed in connection with overhead trolley chain conveyors, and has for its principal object to provide a new and improved construction for trolley brackets of the same general type as disclosed in prior United States Letters Patent Nos. 2,250,167 and 2,398,062. The present application is a continuation in part of our prior United States patent application Serial No. 651,068, and now abandoned.

Trolley brackets of this type have been very extensively used for many years in chain driven overhead trolley conveyor systems. The large volume of such brackets used in numerous industries has resulted in the expenditure of a great deal of time and effort in the improvement and simplification of the same.

These brackets are used in pairs, the upper ends of which are spaced apart and provided with trolley wheels for engagement with the lower horizontally extending flange of a structural member such as a conventional I-beam. The brackets converge together beneath the track and extend through the elongated opening in the center link of a drive chain and are clamped together in assembled spaced relationship for contacting and supporting the side bars of the chain link which seat within a recess provided in the outer face of each bracket. Flanges and ribs are provided on the inner faces of abutting portions of the bracket which, when laterally shifted and overlapped, permit passage through the opening in a chain link and, when moved into opposed relationship, spread the brackets apart to engage the side bars of the chain link.

Improvements heretofore made in this type of bracket have resulted in a number of advantageous features which include the following. Former methods of connecting anti-friction trolley wheels to the bracket members by means of a bolt passing through the inner race of the wheel and the end of the trolley bracket have been superseded by a construction wherein a cylindrical extension integrally formed in the upper end of the bracket member passes through the inner race of the trolley wheel and is permanently swedged after assembly to hold the wheel in position. The interior of such cylindrical extension has been left open as a lubricant reservoir and a lubrication fitting communicating with such reservoir has been provided in a recessed portion of the bracket end in a manner preventing accidental damage thereto.

The integrally formed ribs for spacing a pair of brackets after their insertion within the center link of the drive chain has eliminated the necessity for a separate spacer bar and has permitted the use of a single bolt for assembling a pair of brackets. By forming the brackets to extend below the drive chain with an intermediate space therebetween, provision has been made for the insertion of a load bar which may be connected to the brackets by a bolt passing through each of the brackets and the load bar. Furthermore, each of a pair of brackets has been made identical in form in order to avoid duplicate tooling costs and eliminate any necessity for matching pairs of brackets.

While these features have resulted in a bracket construction highly superior to other types, a number of difficulties have been encountered which are overcome by the present invention.

While prior constructions provide a flange extending along one edge of the inner face of each bracket for lateral engagement with a rib in the opposing bracket in order to keep the brackets in alignment when in assembled position, the single bolt used for assembly did not heretofore operate to lock the ribs in tight engagement with the flanges of the opposing bracket, but merely pressed the flanges against the opposing face of each bracket. Accordingly, rigidity of the assembled pair of brackets depended primarily upon frictional engagement of such flanges with the opposing faces. Strain overcoming frictional engagement tended to shift the brackets somewhat relative to each other and to loosen the assembly. Even the use of lock washers did not suffice to prevent eventual loosening from continuous shifting within the limits of play permitted by the flanges and ribs.

Another difficulty was encountered in connection with assembly and disassembly of a pair of bracket members at a continuous section of standard I-beam track. Since there was not sufficient clearance between the lower extremities of the brackets to permit separation of the upper portions of the brackets sufficient to clear the I-beam flanges while passing through the center link of the chain, it was necessary to provide an open section in the track in order to add or take out trolley bracket assemblies. If this were to be done after a complete installation of a continuous conveyor track, it was necessary to cut open a section of the track in order to replace, add or take out any bracket assembly.

It is the principal object of the present invention to overcome these difficulties and in other respects to simplify and reduce the cost of the bracket construction.

More specifically, it is an object of the present invention to provide a construction which will cause the flanges and ribs of opposing bracket members to be automatically locked in tight lateral engagement in order to completely eliminate any possibility of play between opposing assembled brackets.

Another object is to provide a construction which will permit assembly or disassembly of a pair of brackets with the drive chain at any point along a continuous section of the conveyor line while retaining the advantage of the permanent swedged connection of the trolley wheels to the brackets.

A further object is to provide an integral form in the bracket construction which will eliminate the necessity for using a supplemental fitting for lubrication purposes.

These and other objects will appear more clearly from the following detailed description of a particular embodiment of my invention and from an examination of the drawings forming a part hereof wherein:

Fig. 1 is a side elevation of a bracket assembly in position on an I-beam track;

Fig. 2 is an enlarged sectional view taken along the line 2—2 of Fig. 1;

Fig. 3 is a sectional view taken along the line 3—3 of Fig. 2;

Fig. 4 is a sectional view of the bracket members shown in Fig. 3 shifted laterally for assembly and disassembly;

Fig. 5 is a side elevation of the inner face of a bracket member.

As shown in the drawings, the overhead trolley chain conveyor brackets 10 are supported on a structural member 11 which comprises a conventional I-beam track. The lower horizontally extending flanges 12 of the I-beam are employed as a supporting track for a pair of opposed trolley wheels 13. As each of the trolley wheels 13 and bracket members 10 are identical in construction, a description of one will suffice for both.

Each trolley wheel 13 is rotatably supported on a cylindrical extension 14 projecting inwardly from the upper end of the bracket member. This cylindrical extension 14 projects through the center of the inner race 15 of the trolley wheel, and, when the wheel is in assembled position, the end 16 of the cylindrical extension 14 is swedged outwardly against the inner race 15 of the wheel, thereby permanently retaining the wheel in a fixed position. The outside upper end 17 of the bracket member 10 is formed with a tapered recess 18 adapted to guide a lubricating gun into position for engagement with a lubricating nipple 19 formed as an integral part of the bracket member.

The central section of the bracket is formed on its inner face with a projecting flange 20 extending along one side edge of the bracket. Spaced inwardly from the other side edge of the bracket a distance approximately equal to the thickness of such flange is a projection rib 21. The rib 21 projects from the inner face of the bracket a shorter distance than the flange 20, as shown in Figs. 3 and 4, so that when the bracket members are shifted laterally to a position shown in Fig. 4, their combined thickness is such as to permit insertion within the side bars of a chain link 22. After such insertion the bracket members are moved apart so that the flange 20 abuts against the opposing surface 23 formed on the inner face of each bracket member and the relatively greater combined thickness of the two bracket members will cause the center link to be held in position within the recess walls 24, 25 formed in the outer face of the bracket member.

In assembling the bracket members with the chain link at a continuous section of the I-beam, one of the bracket members is first passed through the center link 22 of the chain and held in engagement with a side bar thereof in proper position. The trolley wheel of such bracket is then placed in location on one side of the I-beam track where the wheel is moved into flush engagement with the central web 26 of the I-beam, as shown in phantom in Fig. 2. The lower end of the second bracket member will then be inserted through the chain link 22 and moved into assembled position. The most critical point of minimum clearance is shown in phantom in Fig. 2. When the trolley wheel of the second bracket has passed the upper flange 27 of the I-beam and is moved over into normal running position, the second bracket member is shifted laterally into normal spaced assembled position thus causing both side bars of chain link 22 to be engaged by the respective brackets.

In order to hold the bracket members together in assembled position, a bolt 28 is provided which extends through the bracket members above the chain link 22. While this general construction is not new, the holes in each bracket member for accommodating the bolt 28 were heretofore in alignment with each other, whereas in the present embodiment, the holes are somewhat laterally offset with respect to each other making it necessary to pass the bolt through at an angle, as shown most clearly in Fig. 3. As the bolt is tightened, it tends to straighten itself and in so doing urges the bracket members to a position where each flange 20 tightly locks against the opposing rib 21. The bolt holes in the bracket members are sufficiently offset so that it will not be possible for the bolt 28 to completely straighten itself through the lateral shifting of the bracket members, and as the nut 29 is tightened, one edge 30 of the bolt head and the opposite edge 31 of the nut tend to dig into the bracket member and provide a tight locking action preventing the possibility of loosening through vibration. With this arrangement no lock washer need be used.

As mentioned above, in former constructions of this type of bracket it is necessary to shift one of the bracket members laterally to an overlapping position, as shown in Fig. 4, and then to move such bracket member upward until the lower end of the bracket member has cleared the chain link. Such movement with conventionally constructed brackets is prevented by the flanges of the I-beam track. Thus, in order to remove or add bracket members, it has been necessary to cut an opening in the track. In order to overcome this limitation the present embodiment incorporates a construction which permits the upper end of a bracket member to be moved outwardly for a sufficient distance to clear flanges of the I-beam track during engagement and disengagement from the chain link. This is accomplished principally by forming the inner face of the bracket member directly beneath the chain link with an abrupt outward offset, as shown at 32, thereby providing a space between bracket members below the chain link substantially exceeding the normal separation above the chain link. This wide separation of the lower extremities of the bracket members permits a substantial pivotal movement of one of the bracket members about the edge of the chain link 22 as is necessary to clear the flanges of the I-beam and as shown in Fig. 2.

Thus, it will be seen that the present invention provides a chain driven trolley conveyor bracket of extremely simple construction incorporating (a) integral means adapted to guide a lubricating gun into position and receive the lubricant, no separate fitting being required; (b) an extremely simple means for locking the bracket members into rigid inter-engagement with a single bolt and nut requiring no lock washer; and (c) means permitting assembly and disassembly of the bracket members at a continuous portion of an I-beam track while retaining the advantages of having the bracket members extend through the opening of the chain link to a position for accommodating a load bar.

While the above description and accompanying drawings relate to a particular embodiment of the present invention, it will be readily understood that numerous variations and modifications could be made without departing from the spirit of the invention as set forth in the following claim.

We claim:

A trolley bracket for a chain driven overhead trolley conveyor system of the type wherein a pair of identical brackets are provided with trolley wheels at their upper ends adapted to run along opposite sides of the lower flange of an I-beam track wherein said brackets converge below such track and extend through the center opening of a solid drive chain link a distance exceeding the width of said brackets, being held in spaced and aligned relationship for supporting engagement with said chain link by opposing flanges and ribs projecting from their inner faces together with a single bolt passing through both brackets, said flanges being capable of disengagement upon lateral shifting of brackets in one direction and adapted to engage said ribs upon lateral shifting of said brackets in an opposite direction, and wherein the lower ends of said brackets below said chain link are adapted to acccommodate the insertion of a load carrying member, and bracket being characterized by an off-center bolt hole requiring the bolt to be passed through said brackets at an angle in a manner whereby the tightening of said bolt will urge opposing flanges and ribs into lateral engagement, and by an outwardly extending offset in the central portion of the inner face below the seat for the chain link in a manner whereby the upper end of one of a pair of said brackets may be tilted outwardly a distance sufficient to clear the flanges of the I-beam track while the lower end of said bracket is passing through said chain link.

JERVIS B. WEBB.
JERVIS C. WEBB.

References Cited in the file of this patent

UNITED STATES PATENTS

| Number | Name | Date |
|---|---|---|
| 411,064 | Scheele et al. | Sept. 17, 1889 |
| 2,075,261 | Bishop | Mar. 30, 1937 |
| 2,095,022 | Bishop | Oct. 5, 1937 |
| 2,117,988 | Schock et al. | May 17, 1938 |
| 2,250,167 | Niles et al. | July 22, 1941 |
| 2,333,867 | Kucho | Nov. 9, 1943 |
| 2,398,062 | Webb et al. | Apr. 9, 1946 |
| 2,411,906 | Suman | Dec. 3, 1946 |